United States Patent [19]
Raymond

[11] Patent Number: 5,586,407
[45] Date of Patent: Dec. 24, 1996

[54] SWATTER AND METHOD OF USING THE SAME

[76] Inventor: Anthony E. Raymond, 5342 W. Bar S St., Tucson, Ariz. 85713

[21] Appl. No.: 436,734

[22] Filed: May 8, 1995

[51] Int. Cl.⁶ .................................................. A01M 3/02
[52] U.S. Cl. .................................. 43/137; 15/DIG. 5
[58] Field of Search ...................... 43/137, 134; 15/186, 15/187, 188, DIG. 5, 167.1

[56] References Cited

U.S. PATENT DOCUMENTS

| | | | |
|---|---|---|---|
| D. 311,050 | 10/1990 | Lisitza | D22/124 |
| 1,586,076 | 5/1926 | Dickey | 43/137 |
| 1,650,548 | 11/1927 | Sullivan | 43/137 |
| 2,157,106 | 5/1939 | Baker | 43/137 |
| 3,673,730 | 7/1972 | Hegenberger | 43/137 |
| 3,727,260 | 4/1973 | Spydevold | 15/186 |
| 3,798,828 | 3/1974 | Walti | 43/137 |
| 3,905,146 | 9/1975 | Ralston | 43/137 |
| 3,984,937 | 10/1976 | Hamilton | 43/137 |
| 4,030,158 | 6/1977 | Blair et al. | 15/DIG. 5 |
| 4,325,392 | 4/1982 | Iten | 15/187 |
| 4,593,489 | 6/1986 | Gott et al. | 43/137 |
| 4,910,909 | 3/1990 | Johnson et al. | 43/137 |
| 5,052,967 | 10/1991 | Slatter et al. | 446/73 |
| 5,459,899 | 10/1995 | Bauer | 15/DIG. 5 |

FOREIGN PATENT DOCUMENTS

| | | | |
|---|---|---|---|
| 1223871 | 6/1960 | France | 15/187 |
| 2587183 | 5/1987 | France | 15/DIG. 5 |

*Primary Examiner*—Joseph J. Hail, III
*Assistant Examiner*—James Miner
*Attorney, Agent, or Firm*—Antonio R. Durando

[57] ABSTRACT

A swatter has a handle, and a flat swatting blade which is fast with the handle. The blade is provided with openings which are uniformly distributed over the blade. Two sets of impaling projections are mounted on one of the major surfaces of the blade. The projections of the two sets are of different length and are uniformly distributed over the blade and among each other. Neighboring projections of each set are spaced from one another by distances which are so large that essentially no squashing of an insect would occur were the insect to be impaled by more than one projection of a set.

8 Claims, 1 Drawing Sheet

SWATTER AND METHOD OF USING THE SAME

BACKGROUND OF THE INVENTION

1. Field of the Invention

The invention relates to a swatter.

2. Description of The Prior Art

U.S. Pat. Nos. 3,905,146; 4,910,909; 5,052,967; and U.S. Pat. No. Des. 311,050 disclose various types of fly swatters. All of these swatters act to squash an insect thereby leaving a residue which must be removed.

U.S. Pat. No. 3,673,730 teaches a fly swatter which is intended to dispose of insects without squashing the same. The swatter consists of a perforated, resilient plastic sheet provided with cushioning strips. According to the patent, if an insect is contacted by one of the strips, the strip compresses at the area of contact while the remainder of the strip retards total compression and prevents squashing. On the other hand, when an insect is positioned between the cushioning strips, the strips retard and cushion movement of the resilient plastic sheet after the strips contact the surface on which the insect is sitting and before the sheet contacts the insect. Squashing is avoided by the composite action of the plastic sheet and the cushioning strips.

Although the swatter of U.S. Pat. No. 3,673,730 represents an improvement over other conventional swatters, squashing is not prevented with as high a degree of reliability as desirable.

BRIEF SUMMARY OF THE INVENTION

It is an object of the invention to provide a swatter which can prevent squashing more reliably.

Another object of the invention is to provide a swatting method capable of preventing squashing with an increased degree of reliability.

The preceding objects, as well as others which will become apparent as the description proceeds, are achieved by the invention.

One aspect of the invention resides in a swatter. The swatter comprises a support, and at least one set of projections on the support for impaling and trapping insects. Neighboring projections are spaced from one another by distances sufficiently large to prevent substantial squashing of insects.

With conventional swatters, the area of contact with an insect is the relatively large projected area of the insect. This makes it difficult to control the force applied to the insect such that the force is large enough to accomplish its purpose but not so large as to squash the insect. Accordingly, squashing cannot be reliably avoided.

In contrast to conventional swatters which make surface contact with an insect, the projections of the invention are designed for point contact. Such point contact, which causes an insect to be impaled, is unlikely to result in squashing even if the applied force is quite large. Thus, the risk of squashing is greatly reduced.

Another aspect of the invention resides in a method of swatting an insect. The method comprises the step of impaling the insect while avoiding substantial squashing thereof.

The method can further comprise the step of releasing the impaled insect by tapping.

BRIEF DESCRIPTION OF THE DRAWINGS

Additional features and advantages of the invention will be forthcoming from the following detailed description of preferred embodiments when read in conjunction with the accompanying drawings.

DESCRIPTION OF THE PREFERRED EMBODIMENTS

Figure 1:
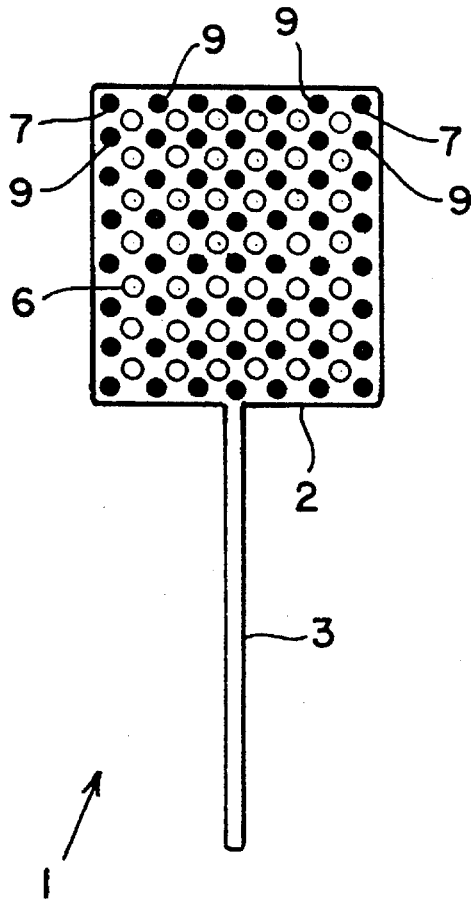
FIG. 1 is a front view of a swatter according to the invention.
Figure 2:
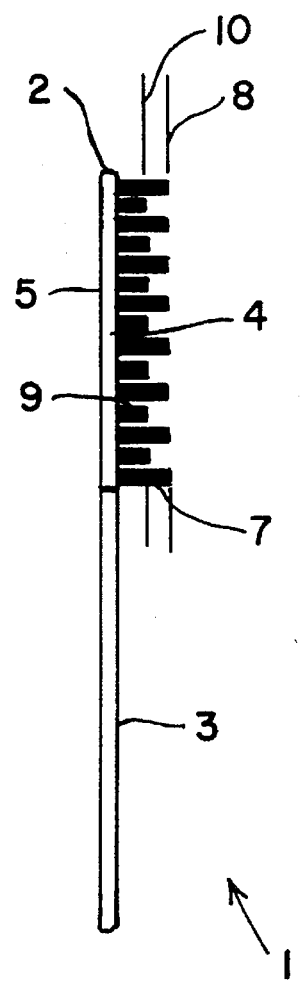
FIG. 2 is a side view of the swatter of FIG. 1.

Referring to FIGS. 1 and 2, a swatter in accordance with the invention is denoted generally by 1. The swatter 1 comprises a generally square or rectangular swatting member or support 2 in the form of a flat sheet. A handle 3 is fast with the swatting member 2 and can be integral therewith. The swatting member 2 has opposed major surfaces 4 and 5 which are generally parallel to one another. The swatting member 2 is provided with a multiplicity of openings or perforations 6 which extend between the surfaces 4,5.

A set of trapping or impaling elements 7 in the form of projections or bristles is molded or otherwise secured to the major surface 4 of the swatting member 2. The impaling elements 7, which are generally straight, extend from the major surface 4 at right angles thereto. Each of the impaling elements 7 is designed to make point contact, rather than surface contact, with an insect. Thus, the impaling elements 7 are rather slender and have a relatively small diameter/length or width/length ratio. The impaling elements 7 are all of the same length, and the tips of the impaling elements 7 are located in a plane 8 which is generally parallel to the major surfaces 3,4 of the swatting member 2. The impaling elements 7 are uniformly distributed over the swatting member 2, and neighboring ones of the impaling elements 7 are spaced from one another by distances which are so great that no substantial squashing of an insect would take place if the insect were impaled by more than one of the impaling elements 7. In other words, the density of the tips of the impaling elements 7 in the plane 8 is low enough that two or more of the impaling elements 7 collectively cannot combine to, in effect, make surface contact with an insect. Instead, the relatively soft, thin and supple exoskeleton of insects allows for their easy penetration and/or trapping by the impaling elements 7.

Due to the relatively large spacing between neighboring ones of the impaling elements 7, the swatter 1 could miss an insect small enough to fit in the gaps between the impaling elements 7. To make the swatter 1 usable for such insects also, the swatting member 2 is provided with a second set of impaling elements 9 in the form of projections or bristles. Like the impaling elements 7, the impaling elements 9 are molded or otherwise secured to the major surface 4 of the swatting member 2. The impaling elements 9 are again generally straight and extend from the major surface 4 at right angles thereto. Each of the impaling elements 9 is designed to make point contact with an insect and, to this end, the impaling elements 9 are rather slender and have a relatively small diameter/length or width/length ratio.

The impaling elements 9 are all of the same length and are uniformly distributed over the swatting member 2 and among the impaling elements 7. Neighboring ones of the impaling elements 9 are spaced from one another by distances which are so great that essentially no squashing of an insect would occur if the insect were impaled by more than one of the impaling elements 9. To avoid an increase in the density of impaling tips in the plane 8, the impaling elements 9 are shorter than the impaling elements 7. For instance, the impaling elements 7 can be ⅜" long while the impaling elements 9 are ¼" long. The tips of the impaling elements 9 are disposed in a plane 10 which is generally parallel to the plane 8 and to the major surfaces 3,4 of the swatting member 2.

In the preferred arrangement shown, the impaling elements 7,9 define rows in which the impaling elements 7 alternate with the impaling elements 9.

The swatting member 2, the handle 3 and the impaling elements 7,9 can all be made of a relatively rigid plastic.

To swat an insect, a person grasps the handle 3 of the swatter 1 and swings the latter towards the insect. The swatter 1 is positioned in such a manner that the tips of the impaling elements 7,9 confront the insect as the swatter 1 is about to contact the insect. The insect is impaled by one or more of the impaling elements 7,9 but is not squashed to any significant degree because the swatter 1 does not make surface contact with the insect. Instead, the swatter 1 makes point contact with the insect at either a single location or a very few relatively widely spaced locations. The intent is that the longer impaling elements 7 absorb the swatting energy and channel the insect through the shorter impaling elements 9, where it is ultimately trapped. Because of their rigidity, the impaling elements prevent the surface 3 of the swatting member 2 from coming into contact with the surface of the object being swatted upon.

After the insect has been impaled, the swatter 1 can be held above a suitable disposal area with the tips of the impaling elements 7,9 facing down. The insect can then be discarded by tapping the swatter 1.

The openings 6 in the swatter 1 allow the swatting member 2 to be easily cleaned under running water.

The swatter 1 is not only capable of catching insects which are resting on surfaces but can also be used to catch insects in midair. Furthermore, the swatter 1 may be used to remove cobwebs and to pick up dead insects.

The swatter 1 can have the same size and shape as conventional swatters.

Various modifications can be made within the meaning and range of equivalence of the appended claims.

I claim:

1. A swattar, comprising a support having a cross section, a pair of opposed substantially flat major surfaces, and perforations arranged in plurality of rows and columns; a first set of impaling elements on said support for impaling insects, said impaling elements of said first set being substantially uniformly distributed throughout said cross section, and neighboring impaling elements of said first set being spaced from one another by distances sufficiently large to prevent substantial squashing of an insect were the insect to be impaled by more than one impaling element of said first set; a second set of impaling elements on said support for impaling insects, said impaling elements of said second set being shorter than said impaling elements of said first set and being substantially uniformly distributed throughout said cross section, and neighboring impaling elements of said second set being spaced from one another by distances sufficiently large to prevent substantial squashing of an insect were the insect to be impaled by more than one impaling element of said second set; and a handle extending from said support.

2. The swatter of claim 1, wherein said impaling elements of said first set have substantially uniform first lengths and said impaling elements of said second set have substantially uniform second lengths.

3. The swatter of claim 1, wherein said impaling elements of said first set are substantially ⅜ inch long and said impaling elements of said second set are substantially ¼ inch long.

4. The swatter of claim 1, wherein said perforations are substantially uniformly distributed over said support.

5. The swatter of claim 1, wherein said support comprises plastic.

6. A method of swatting an insect, comprising the step of impaling the insect with a swatter while avoiding substantial squashing thereof, said swatter including a support having a cross section, a first set impaling elements on said support for impaling insects, a second set of impaling elements on said support for impaling insects, and a handle extending from said support, said impaling elements of said first set being substantially uniformly distributed throughout said cross section, and neighboring impaling elements of said first set being spaced from one another by distances sufficiently large to prevent substantial squashing of an insect were the insect to be impaled by more than one impaling element of said first set, said impaling elements of said second set being shorter than said impaling elements of said first set and being substantially uniformly distributed throughout said cross section, and neighboring impaling elements of said first set being spaced from one another by distance sufficiently large to prevent substantial squashing of an insect were the insect to be impaled by more than one impaling element of said second set.

7. The method of claim 6, wherein said impaling elements of said first set are substantially ⅜ inch long and said impaling elements of said second set are substantially ¼ inch long.

8. The method of claim 6, further comprising the step of releasing the impaled insect by tapping.

* * * * *

UNITED STATES PATENT AND TRADEMARK OFFICE
CERTIFICATE OF CORRECTION

PATENT NO. : 5,586,407
DATED : December 24, 1996
INVENTOR(S) : Anthony E. Raymond It is certified that error appears in the above-identified patent and that said Letters Patent is hereby corrected as shown below:

In Claim 1, column 3, line 45, replace the word "swattar" with --swatter--.

In Claim 1, column 3, line 47, insert --a-- after the word "in".

In Claim 6, line 42, replace the word "first" with --second--.

Signed and Sealed this

Fourth Day of March, 1997

Attest:

BRUCE LEHMAN

Attesting Officer

Commissioner of Patents and Trademarks